Figures 1, 2:
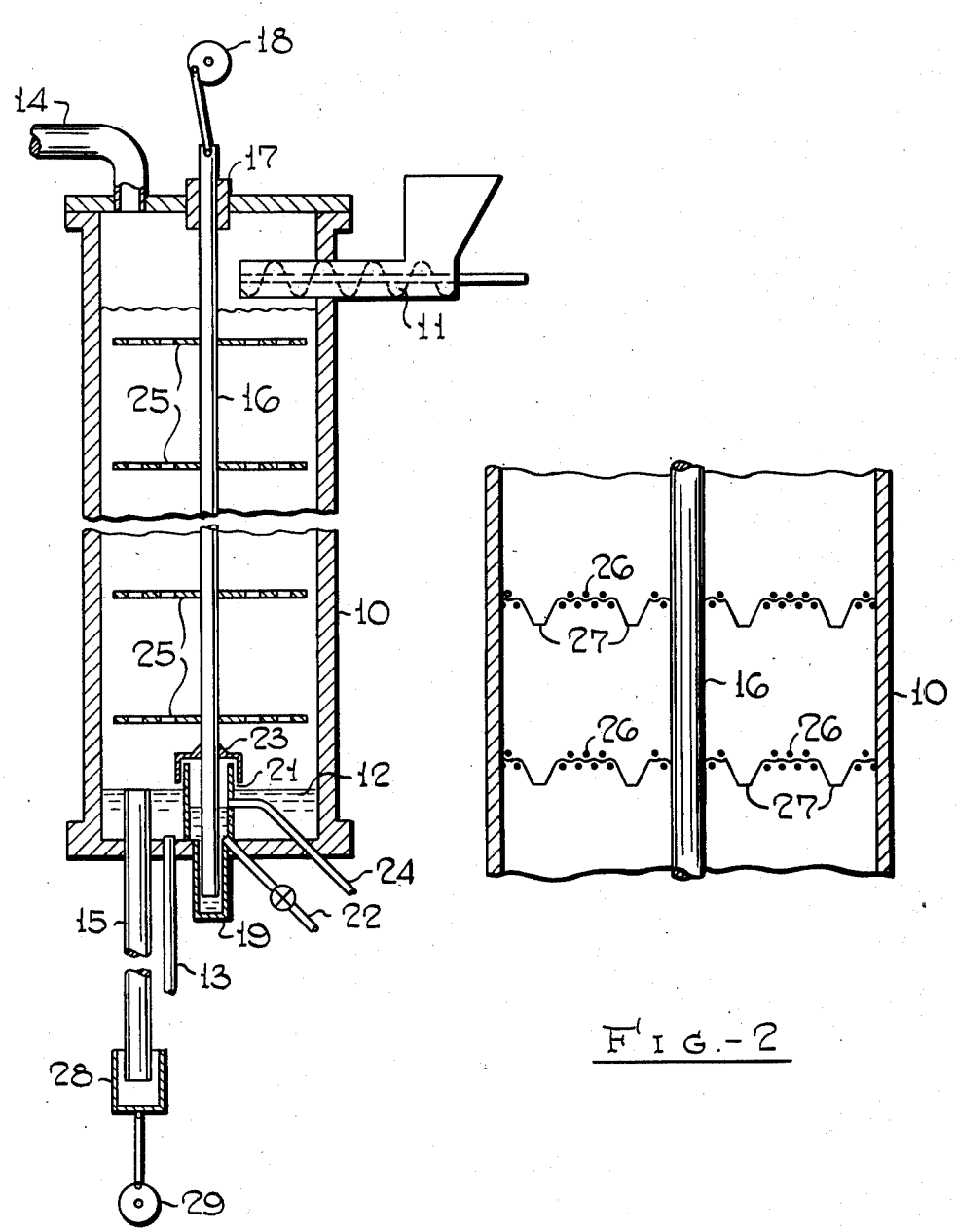

April 21, 1953   M. R. FENSKE ET AL   2,635,949
APPARATUS FOR CONTACTING SOLIDS WITH FLUIDS
Filed March 24, 1949   3 Sheets-Sheet 3
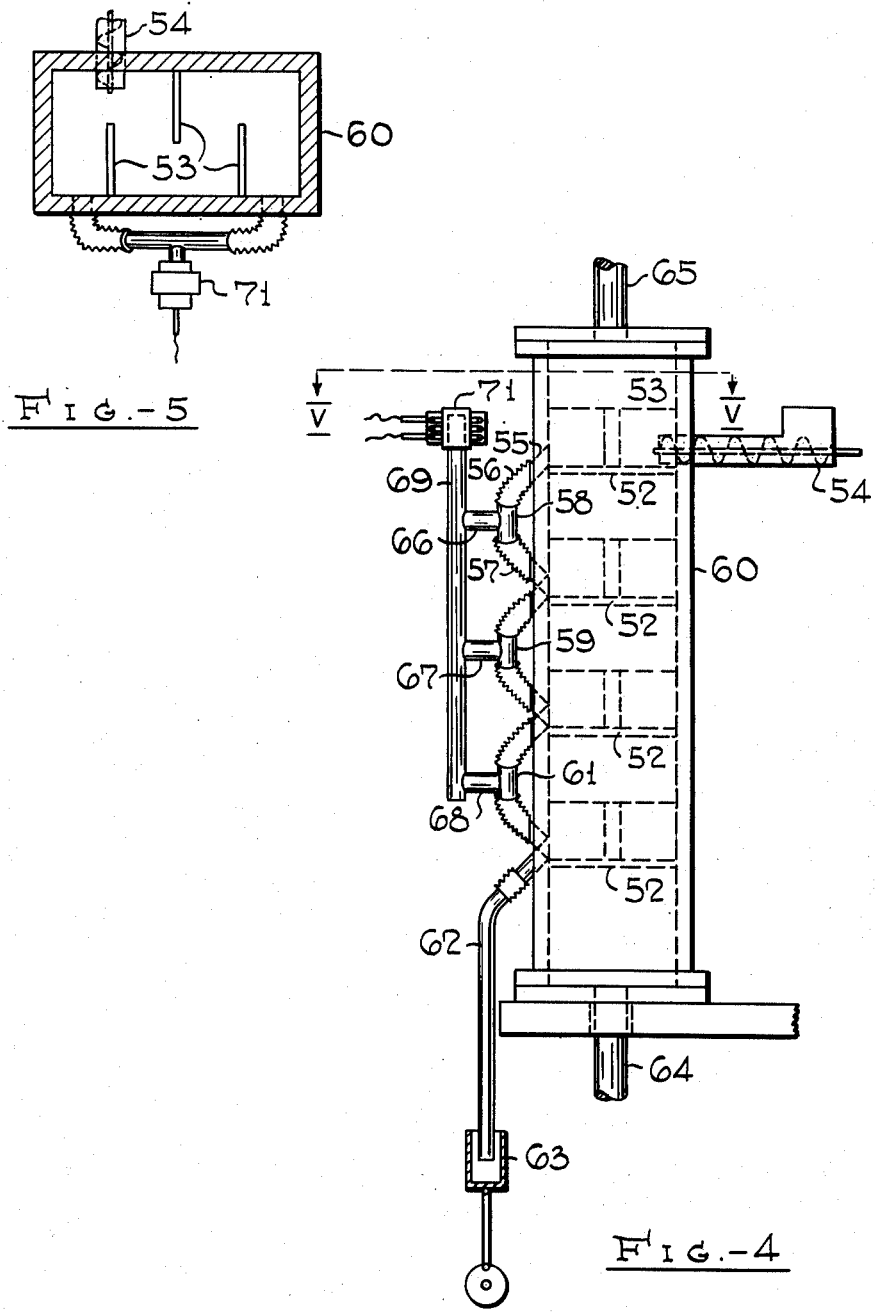
Merrell R. Fenske
Thomas M. Reed III.   Inventors
By Paul O. Dunham  Attorney Patented Apr. 21, 1953

2,635,949

UNITED STATES PATENT OFFICE 2,635,949

APPARATUS FOR CONTACTING SOLIDS WITH FLUIDS

Merrell R. Fenske and Thomas M. Reed III, State College, Pa., assignors to Standard Oil Development Company, a corporation of Delaware Application March 24, 1949, Serial No. 83,172

6 Claims. (Cl. 23—284)

This invention relates to the art of contacting solids with fluids and pertains more specifically to a method of and apparatus for contacting fluids with solids under such conditions that the solids are maintained in a mobile quasi-liquid state called the fluidized state.

It has heretofore been proposed to contact fluids such as gases with subdivided solids by passing the fluid upwardly through a contacting zone or vessel containing a body of the subdivided solids at a velocity controlled to fluidize the solids so that resulting body takes on many of the characteristics of a real fluid. This method of contacting gases with solids has found wide application in the catalytic cracking of oils. It has also been used for the gasification or liquification of coals and, to a limited extent, in other fields wherein it is desired to obtain intimate contact between solids and to maintain the gas and solid at uniform temperature and contacting conditions.

It has been the practice in still other processes, by sacrificing the advantages of the fluidized state in a body of subdivided solid, to obtain the countercurrent flow of a granular solid phase and a gas stream. This method of contacting solids with gases is used in treating gaseous petroleum fractions with activated carbon.

While each of these modes of operation has numerous inherent advantages in many fields, each is also subject to certain limitations and objections. For example, some types of subdivided solids are difficult or impossible to fluidize by means of gas flow alone. In other cases, the range of velocities of the gas necessary to maintain the desired fluidity is relatively narrow and critical. Of particular importance is the fact that it has been impossible heretofore to produce simultaneously the fluidized state and countercurrent flow of a fluid phase and a subdivided solid phase except by using perforated grids, packing elements or other means to prevent overall recirculation of solids and gas in the zone.

The primary object of the present invention is to remove some of the limitations and objections inherent in processes as now practiced for intimately contacting solids and gases.

According to present practices, the energy required to maintain the solids in the fluidized state and to impart the necessary turbulence to the solids is obtained solely from the gases. According to the present invention a part or all of this energy requirement is supplied mechanically by rapidly vibrating or reciprocating elements immersed within the body of solids. By the use of suitably designed and located reciprocating elements described in this invention, it is possible to obtain the fluidized state of the solid and the countercurrent flow of the granular solid phase and the gas phase at the same time in a single body of the mixture.

Furthermore, by the present invention, a fraction of very small particles, which can be fluidized by themselves only with extreme difficulty, if at all, can be readily fluidized. Also, it is now possible to produce new properties in fluidized beds such as varying the degree of fluidization independently of gas velocity, particle size, and weight, and also to produce different densities in beds of fluidized solids independent of gas velocity, solid feed rate and particle characteristics.

The provision of mechanical vibrators or oscillating elements in the contacting zone produces a number of advantages and innovations. Many types of granular solids, such as those composed of large particles on the order of one millimeter in diameter, which cannot be fluidized by gas alone, can be fluidized easily by mechanically vibrating elements immersed in the solids. Similarly, those granular solids, such as fine nickel, iron, and carbon powders below 0.01 millimeter in particle diameter which cannot be fluidized or which can be fluidized only under closely controlled conditions by gas flow alone, can be fluidized over a wide range of gas flow by vibrating elements immersed in the solids.

Even in the cases where fluidity can be readily obtained by the gas alone, the mixing and comixing of the gas phase and the solid phase and the fluidity of the material is, in many cases, materially improved. For example, in a bed of an easily fluidized particular industrial synthetic fluid cracking catalyst, the temperature pattern during heating of the bed shows gradients from point to point when fluidized by gas alone at velocities lower than necessary to produce turbulence. The temperatures are made uniform throughout the volume of this material with the application of vibration by elements immersed in the bulk of the material.

The use of mechanical vibrators makes it possible to fluidize solids below the threshold velocity required for fluidization with gas alone. It is also possible to fluidize solids by vibration at gas velocities higher than the maximum allowable velocity for fluidization by gas alone. Thus, with the application of vibration, it is possible to extend the range of gas velocities which may be used at fluidizing conditions.

The use of vibrating elements in the body of solids further provides a means of producing and controlling fluidization independent of gas velocity for solid particles of any given weight and size. This control is advantageous, for example, in reducing and eliminating entrainment of the granular solid by the gas in many cases, since it is possible to fluidize solids at gas velocities below the minimum velocity which is required to lift particles against the particle weight. Furthermore, a layer of large light particles may now be made to float on the surface of a fluidized bed composed of small more dense particles. The layer of large floating material, fluidized by vibrating elements immersed therein, then may act as an efficient baffle section which removes the small entrained particles in the gas stream from the main bed beneath.

In addition, without changing the gas velocity, it is possible to alter the bulk density and solid concentration of a fluidized bed by vibration of elements immersed in the solids. In the case of a bed composed of light particles between 0.001 and 0.01 millimeter in diameter and aerated with vibration of elements immersed in the material, the bulky density can be reduced to one-half the value obtained without vibration.

The effect of vibration on the pressure drop through beds of fluidized solids is another example of the advantages gained by the use of this invention. A maximum value for the pressure drop in the gas stream flowing through a completely fluidized bed is equal to the mass of granular solid above unit area of the bottom of the bed. In materials such as those composed of a substantial portion, amounting to more than thirty percent of very fine particles below 0.01 millimeter in diameter, and particularly where the particles are dense metals or oxides, the pressure drop in beds fluidized by gas flow alone is below the maximum value. This condition indicates incomplete fluidity and incomplete interphase contact in the bed. By agitating the solid with vibrators immersed in the solid, the mixing and comixing can be improved to such a degree that the pressure drop attains the maximum value corresponding to the mass per unit area at the bottom of the bed. At this optimum condition with respect to pressure drop, all the solid particles in the bed enter into the fluid activity of the bed and are in contact with the flowing gas stream. At lower pressure drops some of the particles are stagnant and are not in contact with flowing gas.

Other objects and advantages of the invention will be apparent from the detailed description hereinafter.

Figure 3:
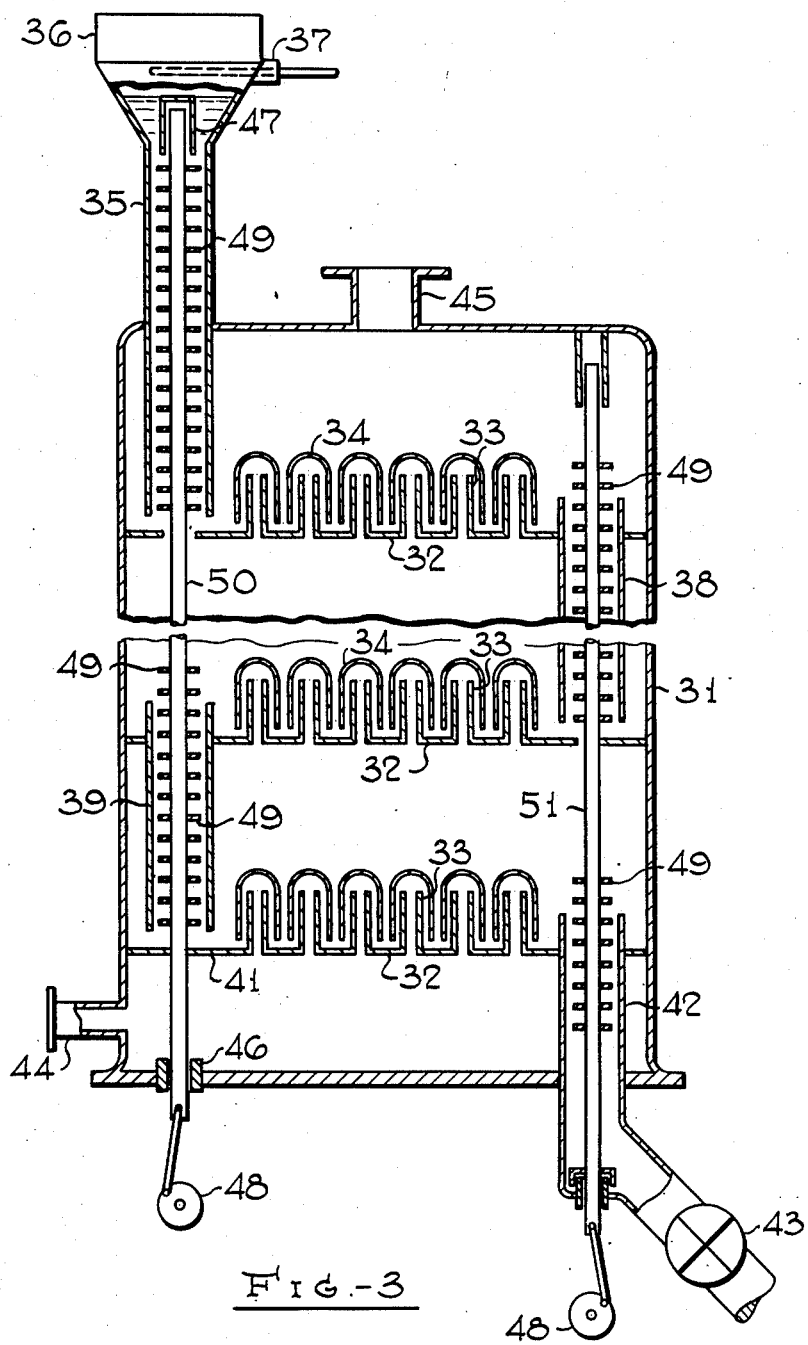

Reference will now be made to the accompanying drawings wherein Figure 1 illustrates a sectional elevation of one form of apparatus forming a part of the present invention. Figure 2 is a fragmental sectional view showing a different form of reciprocating or vibrating elements. Figure 3 is an elevation with part broken away representing another form of apparatus showing multiple trays or hearths over which a stream of solids flows in fluidized condition. Figure 4 illustrates a further modification wherein the solids passing from one tray to another are subjected to vibrating action and Figure 5 is a sectional view taken along the lines of 5—5 shown in Figure 4.

Referring to Figure 1, the reference character 10 designates the outer shell of a vessel used for contacting the solids and gas. The solids in subdivided form are introduced into the vessel 10 through any suitable conveyor means such as a screw conveyor 11 which discharges into the upper end of the vessel. Spaced from the bottom of the vessel 10 is a transverse foraminous plate 12 which may be in the form of a grid, screen or gas permeable plate capable of permitting passage of gas while retaining solids. Gas to be treated or contacted in the vessel 10 with the solids is introduced into the bottom through line 13 below the plate 12 and the treated gas is removed from the top of the vessel to the conduit 14. Solids may be withdrawn from the vessel 10 through the conduit 15 which has an extension projecting through the plate 12. Positioned within the vessel is a central vertical rod 16 capable of reciprocating in a vertical direction within the vessel. The upper end of the rod 16 may project through a stuffing box 17 at the top of the vessel and may be connected with a suitable reciprocating device such as an eccentric 18. The bottom of the rod 16 is positioned in a cup shaped member 19 which serves as a guide or bearing for the rod. Surrounding the bottom of the rod 16 and spaced therefrom is an annular flange 21 which is secured to the bottom of the vessel. The space between this flange and the reciprocating rod may be filled with a suitable liquid which may be introduced through line 22. This liquid serves as a seal preventing the solids from contacting the surface in cup shaped member 19. A cap member 23 mounted on rod 16 is adapted to fit over the outer annular flange 21. A sealing gas is introduced into the space above the liquid through line 24 at a pressure somewhat above the pressure on the gas in the vessel 10 thereby to prevent the solids from entering the bearing box.

A series of vertically spaced reciprocating elements 25 are rigidly mounted on the shaft 16, as illustrated in Figure 1. These reciprocating elements are shown in the form of horizontal perforated discs having a relatively large proportion of open space. The total amount of open space in the reciprocating elements may range from 35 to 70% of the total cross sectional area of the vessel.

While Figure 1 illustrates perforated discs as reciprocating elements, various other types of elements may be employed. Figure 2, for example, is a fragmentary view of Figure 1, showing a different type of reciprocating elements. In Figure 2 the reciprocating elements comprise an open mesh screen 26, or rigid metal cloth, which may be suitably reinforced to improve rigidity. These screens may be provided with cones or nozzles 27 extending beneath the plane of the screen and distributed over the surface thereof. The granular solid flows preferentially downwardly through the nozzles 27 while permitting the gas to pass upwardly between the interstices in the screen 26. These screens are mounted on the central shaft 16 and are adapted to reciprocate with the shaft as described in Figure 1. The outer periphery of the screen elements 26 of Figure 2 may be spaced from the wall of the vessel 10 in a manner similar to the discs shown in Figure 1, or they may be caused to slide on the outer wall as shown in Figure 2. With vibrating elements of this type the countercurrent flow of a gas and a fluidized solid may be accomplished.

Returning again to Figure 1, the lower end of the outlet conduit 15 may be positioned within a cup shaped member 28 and this cup may be reciprocated by a suitable reciprocating element such as an eccentric 29 to control the rate of withdrawal of the solids from the vessel 10. The vessel 10 may be operated in a continuous manner with a continuous introduction of the solids through the feeder 11 and the continuous withdrawal through line 15, or it may be operated intermittently with periodic introduction and removal of the solids from the vessel.

Figure 3 illustrates a further modification in which the contacting vessel contains a plurality of vertically spaced trays with inter-connecting conduits having reciprocating elements disposed therein. Referring to Figure 3, the reference character 31 designates the outer shell of the contacting vessel. Disposed within the shell is a plurality of trays 32. Each of these trays has a plurality of upwardly extending tubes 33 for the passage of gas from one tray to another and each of these tubes is provided with a cap 34 which directs the flow of gases downwardly below the level of the solid material contained on each tray. The subdivided solid material to be contacted with the gas is introduced into the top tray into the vertical conduit 35 having a hopper 36 at the top. This hopper may contain a slide valve 37 to control the flow of the solids into the vessel. The solids introduced into the vessel 31 through the conduit 35 flow transversely across the upper tray 32 and overflow into conduit 38, which leads to the next adjacent tray. The upper end of the conduit 38 extends above the tray 32. The depth of solid material in the trays is normally set by the distance between the tray and the top of the conduit 38. As illustrated, the upper end of the conduit 38 is positioned below the tops of the bell caps 34 so that the level of solid material in the tray 32 is below the level of the bell caps 34. As a result, the solid material is caused to flow around the individual caps before being withdrawn through the conduit 38. The solids passing across the upper tray 32 are maintained in a fluid state by the gases being injected below the surface thereof through the tubes 33.

The solids discharging from the conduit 38 to the intermediate tray 32 pass transversely across the latter tray and overflow into the conduit 39 which leads to the lower tray 41. The solids again flow across the lower tray 41 between the individual bell caps and overflow into the outlet conduit 42, where the solids are withdrawn from the vessel. A control valve 43 may be positioned within the outlet conduit 42 to control the rate of withdrawal of the solids therefrom. Gas to be contacted with the solids passing to and fro through the contact vessel is introduced into the lower portion of the vessel 31 through line 44. This gas passes parallel through the individual conduits 33 in the lower tray and in series through the conduits 33 in the separate trays. The gas, after passing through the vessel, is withdrawn from the upper end thereof through line 45. The rate of flow of the gases upwardly through the vessel is controlled to maintain the solids on the individual trays in a free flowing fluidized state.

As shown in the drawings, a vertical reciprocating plunger 50 or rod extends upwardly through the bottom of the vessel and through the center portion of the conduits 35 and 39 respectively, and a similar rod 51 is positioned in conduit 38 and the outlet conduit 42. Plunger rod 50 is provided with suitable bearings 46 and 47 to permit reciprocating motion applied thereto by any suitable reciprocating device such as eccentric 48. The rod 51 is similarly mounted for reciprocation in the conduits 38 and 42. Each of the rods is provided with a plurality of vertically spaced vibrating elements 49. As illustrated, these vibrating elements are in the form of discs mounted on the reciprocating rods. Other suitable reciprocating elements may be substituted in place of the discs, such as grids or screens, which are capable of imparting the energy of vibration to the material in the conduits.

In the apparatus shown in Figure 3, no special provision is made for agitating the solids during passage over the individual trays 32. If desired, however, the caps 34 may be supported on suitable rods which, in turn, are connected to the plunger rods 50 and 51 to cause the individual caps to reciprocate up and down to serve as additional vibrating elements in the bed itself. Other means may also be provided for agitating the solids on the trays 32. While bubble caps have been shown as a means for distributing the gas on the individual trays, other types of construction capable of effecting such distribution may be used in place thereof. For example, each of the trays may be in the form of simple grids with perforations permitting the gas to pass upwardly through the individual beds.

It is usually desirable, in connection with the apparatus shown in Figure 3, to introduce a small stream of gas into the bottom of conduits 35, 38, 39 and 42. This gas may be separately injected, or it may be gas passing up through an annulus between rods 50 and 51 and plates 32.

Figures 4 and 5 illustrate further embodiments of a type similar to that shown in Figure 3, in that the solids are introduced into the top of the vessel and are caused to pass in a tortuous path over a plurality of trays positioned therein before being withdrawn from the bottom. Agitation is accomplished in the apparatus illustrated in Figures 4 and 5 by vibrating the conduits used for transferring the solids from one tray to the other.

Referring to Figure 4, the apparatus comprises an outer shell 60 containing a plurality of vertically spaced perforated trays 52. Disposed above each of the trays is a series of staggered baffles 53 as best shown in Figure 5. The vessel in this case is shown to be rectangular and the solids passing across the individual trays are forced to take a tortuous path by means of staggered baffles 53. The solids to be treated are introduced above the uppermost tray through suitable conveyor means such as a screw conveyor 54. The solids so introduced pass back and forth between the baffles and are withdrawn from the opposite side of the tray through an external conduit 55 having flexible sections 56 and 57 such as bellows and an intermediate section 58. The solids introduced into the second tray through the external conduit 55 pass in a similar manner across this tray and are then transferred to an external conduit 59 having a construction similar to the conduit 58. The solids pass in a similar manner across the third tray and are transferred to the bottom tray through a similar conduit 61. The solids are withdrawn from the lower tray through a conduit 62 having the lower end mounted in a cup member 63 which may be vibrated to control the rate of withdrawal therefrom. The gases to be contacted with the solids are introduced into the vessel through line 64 and after passing in series upwardly through the openings in the individual trays 52, are withdrawn from the top through line 65. As described in previous modifications the rate of flow of the gas upwardly through the bed of solids supported by the individual trays is controlled to maintain the solids on the trays in a fluidized state.

The intermediate section of the external conduits 58, 59, and 61 are rigidly connected through connections 66, 67, and 68 to a vertical reciprocating plunger or rod 69 which may be reciprocated by any suitable reciprocating mechanism such as a solenoid 71. The vibration of the intermediate section of the external conduits imparts fluidity to the solids passing through the conduits and thus enables the solids to flow freely therethrough.

In each of the modifications above described, fluidity of the solids is aided or accomplished by energy applied by mechanical vibrating elements. The particular designs and forms given to the mechanically vibrated elements depend upon the application and the results desired with respect to the intensity of vibration, the rapidity and direction of mixing of the phases, the direction of flow of the granular solid phase, and the type of granular solid to be fluidized.

There are a few preferred designs which produce special effects or which are particularly applicable in certain instances. In tall columnar beds of granular solids planar disc-shaped elements, the areas of which are from about 35 to 70 per cent open, are satisfactory for fluidizing the bed by up-and-down or oscillating vibration. Thin discs are preferable. When the discs are made of screen mesh ranging anywhere from 6 meshes to 200 meshes per inch, they are particularly effective in producing very smooth fluid motion of the granular solid and very good co-mixing of the phases. The mesh size depends upon the diameters of the particles to be fluidized and upon the extent of circulation and overall mixing of the solid phase. If the openings in the screen discs are smaller than the smallest particle and the discs extend throughout the entire cross section of the column, the movement of the particles can be restricted to a definite element of volume. If the openings are larger than the largest particle in the bulk of the solid phase, good overall mixing and circulation of the bed can be produced by vibration.

Special perforations in screen discs are suitable for producing directional flow of the solid phase.

Small solid discs 0.1 to 0.2 inch thick which do not extend to more than one-half the diameter of a circular bed are very satisfactory for smoothing the fluidity by vibration of granular solids which are easily fluidized or which are fluidized by gas flow alone.

In many cases, the preferred design for disc-shaped elements vibrated in an up-and-down direction for fluidizing aerated granular solids is in the form of an open and extended rigid plane which spreads throughout the whole cross section of the volume of solid to be fluidized, but which is very open and perforated with many passages to permit the unobstructed flow of the real fluid through the bed and at the same time to provide a sufficient rigid vibrating structure throughout the cross section. Structures such as loose strands of chain hung on the vibrating shaft parallel to the direction of vibration are also satisfactory because they are free to move rapidly throughout the volume of solid phase and offer little or no obstruction to the flow of the fluid stream.

In cylindrical beds or conduits ranging from about 2 to 10 inches in diameter for the flow of solids, a spacing of about two inches is optimum for perforated discs or screen discs. For large bed volumes greater than about three feet in diameter or where the dimensions of a rectangular cross sectioned volume are of this order and larger, the vertical spacing of the vibrated elements may range from about 1 to 3 feet apart. Satisfactory ratios of vertical space between elements to the bed diameter usually will be found to be between about 0.2 and 1.

In arrangements where there is a large cross section of a bed of solid to be fluidized by vibration or where the cross section is rectangular or of some unsymmetrical shape, rather than using one large element several small elements imbedded in the solid phase are located throughout the cross section. Each of these vibrators can be oscillated individually by separate driving mechanisms, or all of them may be attached to a single reciprocating shaft. With separate controls of the vibration intensity on the individual shafts, different conditions with respect to bed density can be obtained in adjacent regions of a large bed. These differences in density can be utilized to produce forced mass circulation of the granules in a manner analogous to convection currents caused by density differences in systems of miscible real fluids.

The invention is adapted for use in cases where the solids are relatively finely divided, such as where the particle diameter is below 3 millimeters. The preferred range of particle size is between 0.001 and 2 mm. The particles may have a wide range of density and it is not necessary that the particles have a uniform or narrow range of particle sizes.

The invention may also be used over a wide range of pressures and temperatures.

The amplitude of the vibrating elements should preferably be between about 0.1 and 1.0 inch and the frequency of the vibration should be between 500 and about 2000 cycles per minute. Within the limits above specified, the amplitude and the frequency of the vibration are reciprocal in that the greater the amplitude the less the frequency required for the same degree of fluidity.

The invention finds application in the wide variety of services such as in catalytic reactions wherein the solids are used as a catalyst, in the treatment of solids such as in the gasification of coal, and in the distillation of oil shales. It may also be used for the selective adsorption of gases in which the solids form an adsorbent for certain components of the gas stream.

The oscillating or vibrating elements can also be used advantageously in adding or removing heat from a fluidized bed. Because of the increased mixing and co-mixing of the phases that occurs in the process and apparatus of the present invention, the ability is increased to transfer heat either between the solids and heating and cooling elements in contact with the bed, or between the solids and the real fluid, such as a gas, passing through the fluidized bed. This is an important feature of the present invention for in many reactions the ability to control temperature, or the heat flow, is an important factor in attaining the desired results from fluidized beds of solids. The oscillating or vibrating elements can be made hollow, at least in part, to provide for a heating or cooling means to flow through these elements. This is a particularly desirable way to effect good heat transfer within the bed. Stationary or fixed heating and cooling means, such as coils or other conventional tubular arrangements, can also be placed in close proximity to the vibrating elements to benefit from the greatly increased mixing and turbulence produced in the bed in the vicinity of these vibrating elements. In cases where solid films are produced on heat transfer surface positioned in beds of fluidized solids which lower the rate of heat flow, the use of vibrating elements in close proximity to the heat transfer surface is beneficial in keeping such surface clean and effective.

In some cases when employing very small particles, such as in the range of 0.010 mm. that cannot be fluidized alone by gas at any gas velocity through the bed, the entrainment, or amount of solid escaping from the top of the bed per unit of gas volume, may be considerably higher when using vibration to fluidize the bed than when the gas alone is blown through the bed. These instances frequently occur when the finely divided solid has a tendency to be sticky or to have a sticky or wet appearance. This additional solid entrainment need not be objectionable for all of the bed need not be subjected to the action of vibrating elements. Specifically, in such cases it is frequently desirable not to have the vibrating elements extend to the top of the bed. Instead the top of the bed should comprise a more stationary or semi-fluid zone which allows the entrained particles to occlude on other particles or to fall back into the bulk of the bed. In these cases, it is particularly desirable to provide a zone at or above the top of the main fluid bed wherein a large proportion of the entrained particles can be separated from the gas by the combined action of gravity and contact with other particles less fluidized than those that caused the entrainment.

Having described the preferred embodiments of the invention, it will be understood that it will be based on certain other variations and modifications as come within the scope of the accompanying claims.

We claim:

1. An apparatus for contacting gases with finely divided solids which comprises a vertically extending cylindrical chamber adapted to contain a body of said solids, means for introducing a stream of said solids into the upper end of said chamber and for withdrawing solids from the bottom portion thereof, means for introducing gases to be contacted into the bottom portion of said chamber and for withdrawing gases from the upper portion thereof, a vertical shaft movably mounted in said chamber, means for reciprocating said shaft at an amplitude between 0.1 and 1.0 inch and at a frequency between 500 and 2000 cycles per minute, and a plurality of vertically spaced foraminous horizontal disc-shaped members rigidly mounted on said shaft, the open space in each foraminous member being from about 35 to 70% of the total cross-sectional area of the chamber.

2. The apparatus defined in claim 1 which further comprises a cup shaped member mounted in the bottom of said chamber adapted to receive the lower end of said vertical shaft, a sealing liquid contained in said cup member having the upper level above the bottom of said shaft and means for introducing a gas into said cup shaped member above the level of said liquid seal to prevent said finely divided solids from intermixing with said liquid.

3. The apparatus defined in claim 1 wherein the ratio of vertical space between foraminous members to the chamber diameter is between about 0.2 and 1.

4. The apparatus defined in claim 3 wherein the foraminous members are provided with a plurality of nozzles extending beneath the plane of the members and distributed over the surface thereof.

5. In a vessel for contacting gases with finely divided solids which contains in combination a plurality of vertically spaced, substantially horizontal foraminous trays adapted to permit upward passage of gas therethrough and to support a fluidized body of said solids, vertical conduits interconnecting the said trays and adapted to permit downward passage of the solids from one tray to another, means for introducing a stream of said solids into an upper portion of said vessel and for withdrawing solids from a bottom portion thereof, and means for introducing gases into a bottom portion of said vessel and for withdrawing gases from the upper portion thereof, the improvement which comprises vertical shafts movably mounted in the said interconnecting conduits, means for reciprocating the shafts at an amplitude between 0.1 and 1.0 inch and at a frequency between 500 and 2000 cycles per minute, and a plurality of vertically spaced, horizontal, perforated disc-shaped members rigidly mounted on said shafts, the open space left by each perforated member being from about 35 to 70% of the total cross-sectional area of the interconnecting conduit in which the said member is mounted.

6. The vessel defined in claim 5 wherein the trays are bubble cap trays.

MERRELL R. FENSKE.
THOMAS M. REED III.

References Cited in the file of this patent
UNITED STATES PATENTS

| Number | Name | Date |
|---|---|---|
| 2,011,186 | Van Dijck | Aug. 13, 1935 |
| 2,112,643 | Baensch et al. | Mar. 29, 1938 |
| 2,150,608 | Olier | Mar. 14, 1939 |
| 2,360,787 | Murphree et al. | Oct. 17, 1944 |
| 2,444,990 | Hemminger | July 13, 1948 |
| 2,540,706 | Beck et al. | Feb. 6, 1951 |
| 2,542,587 | Smith | Feb. 20, 1951 |